United States Patent
Ledroz et al.

(10) Patent No.: US 9,631,475 B2
(45) Date of Patent: Apr. 25, 2017

(54) SYSTEM AND METHOD FOR MONITORING TOOL ROTATION DURING A GYROCOMPASSING WELLBORE SURVEY

(71) Applicant: Gyrodata, Incorporated, Houston, TX (US)

(72) Inventors: Adrián Guillermo Ledroz, Houston, TX (US); James Michael Johnson, Cypress, TX (US)

(73) Assignee: Gyrodata, Incorporated, Houston, TX (US)

( * ) Notice: Subject to any disclaimer, the term of this patent is extended or adjusted under 35 U.S.C. 154(b) by 150 days.

(21) Appl. No.: 14/245,784

(22) Filed: Apr. 4, 2014

(65) Prior Publication Data

US 2015/0285056 A1    Oct. 8, 2015

(51) Int. Cl.
| | |
|---|---|
| E21B 44/00 | (2006.01) |
| E21B 47/00 | (2012.01) |
| G01C 19/00 | (2013.01) |
| G01P 15/14 | (2013.01) |
| E21B 47/024 | (2006.01) |

(52) U.S. Cl.
CPC ............ *E21B 47/00* (2013.01); *E21B 47/024* (2013.01); *G01C 19/00* (2013.01); *G01P 15/14* (2013.01)

(58) Field of Classification Search
CPC ... E21B 44/00; E21B 47/022; A63B 2220/40; G01V 1/3808
USPC ........ 73/152.43, 152.01, 488; 702/7, 6, 2, 1; 33/304, 313, 300
See application file for complete search history.

(56) References Cited

U.S. PATENT DOCUMENTS

| | | | | |
|---|---|---|---|---|
| 5,657,547 | A * | 8/1997 | Uttecht | E21B 47/022 33/302 |
| 5,806,195 | A | 9/1998 | Uttecht et al. | |
| 5,821,414 | A * | 10/1998 | Noy | E21B 47/022 33/304 |
| 6,347,282 | B2 * | 2/2002 | Estes | G01C 19/38 702/6 |
| 6,381,858 | B1 * | 5/2002 | Shirasaka | G01C 21/16 33/304 |
| 6,957,580 | B2 * | 10/2005 | Ekseth | E21B 47/022 73/152.46 |
| 7,117,605 | B2 * | 10/2006 | Ekseth | E21B 47/022 33/304 |
| 7,225,550 | B2 * | 6/2007 | Ekseth | E21B 47/022 33/304 |

(Continued)

OTHER PUBLICATIONS

Uttecht, et al.; Survey Accuracy is Improved by a New, Small OD Gyro; World Oil; Mar. 1983.

*Primary Examiner* — Lisa Caputo
*Assistant Examiner* — Nigel Plumb
(74) *Attorney, Agent, or Firm* — Pramudji Law Group PLLC; Ari Pramudji

(57) ABSTRACT

Systems and methods for monitoring the tool rotation of a survey tool within a wellbore during a gyrocompassing survey measurement are provided. A plurality of signals from at least one accelerometer module of the survey tool is indicative of measurements of the Earth's gravitation vector taken by the at least one accelerometer module during the gyrocompassing survey measurement. The plurality of signals is used to calculate a tool face rate of change of the survey tool with respect to the wellbore during the gyrocompassing survey measurement.

18 Claims, 4 Drawing Sheets

(56) References Cited

U.S. PATENT DOCUMENTS

| | | | | |
|---|---|---|---|---|
| 7,234,539 | B2* | 6/2007 | Wright | E21B 47/024 |
| | | | | 175/45 |
| 7,350,410 | B2* | 4/2008 | Ekseth | E21B 47/022 |
| | | | | 73/152.45 |
| 7,669,656 | B2 | 3/2010 | Wright et al. | |
| 8,065,085 | B2* | 11/2011 | Ekseth | E21B 47/04 |
| | | | | 702/10 |
| 8,185,312 | B2* | 5/2012 | Ekseth | E21B 7/067 |
| | | | | 702/7 |
| 2003/0056381 | A1* | 3/2003 | Brosnahan | E21B 47/022 |
| | | | | 33/313 |
| 2005/0268476 | A1* | 12/2005 | Illfelder | E21B 47/022 |
| | | | | 33/313 |
| 2010/0100329 | A1* | 4/2010 | Ekseth | E21B 47/022 |
| | | | | 702/7 |
| 2011/0011646 | A1* | 1/2011 | Giroux | E21B 7/06 |
| | | | | 175/61 |
| 2013/0211723 | A1* | 8/2013 | Weston | G01P 21/00 |
| | | | | 702/6 |

* cited by examiner

SYSTEM AND METHOD FOR MONITORING TOOL ROTATION DURING A GYROCOMPASSING WELLBORE SURVEY

BACKGROUND

Field of the Application

The present application relates generally to surveys of wellbores, and more particularly, to gyrocompassing surveys and measurements taken during the drilling process for wellbores for oil field and gas field exploration and development.

Description of the Related Art

A survey tool configured to be used a wellbore can comprise at least one gyroscopic sensor configured to provide at least one data signal indicative of the orientation of the survey tool relative to the rotation axis of the Earth. For example, the at least one gyroscopic sensor can comprise a rate gyroscope (e.g., a spinning gyroscope, typically with the spin axis substantially parallel to the wellbore). The rate gyroscope undergoes precession as a consequence of the Earth's rotation. The rate gyroscope is configured to detect the components of this precession and to generate at least one corresponding data signal indicative of the orientation of the rate gyroscope's spin axis relative to the Earth's axis of rotation. By measuring this orientation relative to the Earth's axis of rotation, the rate gyroscope can determine the orientation of the survey tool relative to true north. Such rate gyroscopes can be used in a gyrocompass mode while the survey tool is relatively stationary. In certain systems, the survey tool (e.g., a measurement-while-drilling or MWD survey tool) can be part of a steerable drilling tool, and can be used in a gyrosteering mode while drilling is progressing.

SUMMARY

In certain embodiments, a method for monitoring the tool rotation of a survey tool within a wellbore during a gyrocompassing survey measurement is provided. The method comprises receiving a first plurality of signals from at least one accelerometer module of the survey tool. The first plurality of signals is indicative of measurements of the Earth's gravitation vector taken by the at least one accelerometer module during the gyrocompassing survey measurement. The method further comprises using the first plurality of signals to calculate a tool face rate of change of the survey tool with respect to the wellbore during the gyrocompassing survey measurement.

In certain embodiments, a method for compensating for tool rotation of a survey tool within a wellbore during a gyrocompassing survey measurement is provided. The method comprises receiving a first plurality of signals from at least one accelerometer module of the survey tool. The first plurality of signals is indicative of measurements of the Earth's gravitation vector taken by the at least one accelerometer module during the gyrocompassing survey measurement. The method further comprises using the first plurality of signals to calculate a tool face rate of change of the survey tool with respect to the wellbore during the gyrocompassing survey measurement. The method further comprises receiving a second plurality of signals from at least one gyroscopic sensor module of the survey tool. The second plurality of signals is indicative of a total rotation rate to which the survey tool is subjected during the gyrocompassing survey measurement. The method further comprises using the second plurality of signals to calculate the total rotation rate to which the survey tool is subjected during the gyrocompassing survey measurement. The method further comprises subtracting the tool face rate of change with respect to the wellbore during the gyrocompassing survey measurement from the total rotation rate to which the survey tool is subjected during the gyrocompassing survey measurement.

In certain embodiments, a system is provided. The system comprises a survey tool configured to perform gyrocompassing surveys. The survey tool comprises at least one gyroscopic sensor module configured to generate a first one or more signals indicative of measurements of a total rotation rate to which the at least one gyroscopic sensor module is exposed during a gyrocompassing survey. The system further comprises at least one accelerometer module configured to generate a second one or more signals indicative of measurements of the Earth's gravitation vector at the at least one accelerometer module. The system further comprises at least one processor configured to receive at least the first one or more signals and the second one or more signals and to determine the tool angle rotation rate in response to the second one or more signals.

BRIEF DESCRIPTION OF THE DRAWINGS

Various configurations are depicted in the accompanying drawings for illustrative purposes, and should in no way be interpreted as limiting the scope of the systems or methods described herein. In addition, various features of different disclosed configurations can be combined with one another to form additional configurations, which are part of this disclosure. Any feature or structure can be removed, altered, or omitted. Throughout the drawings, reference numbers may be reused to indicate correspondence between reference elements.

DETAILED DESCRIPTION

Figure 1:
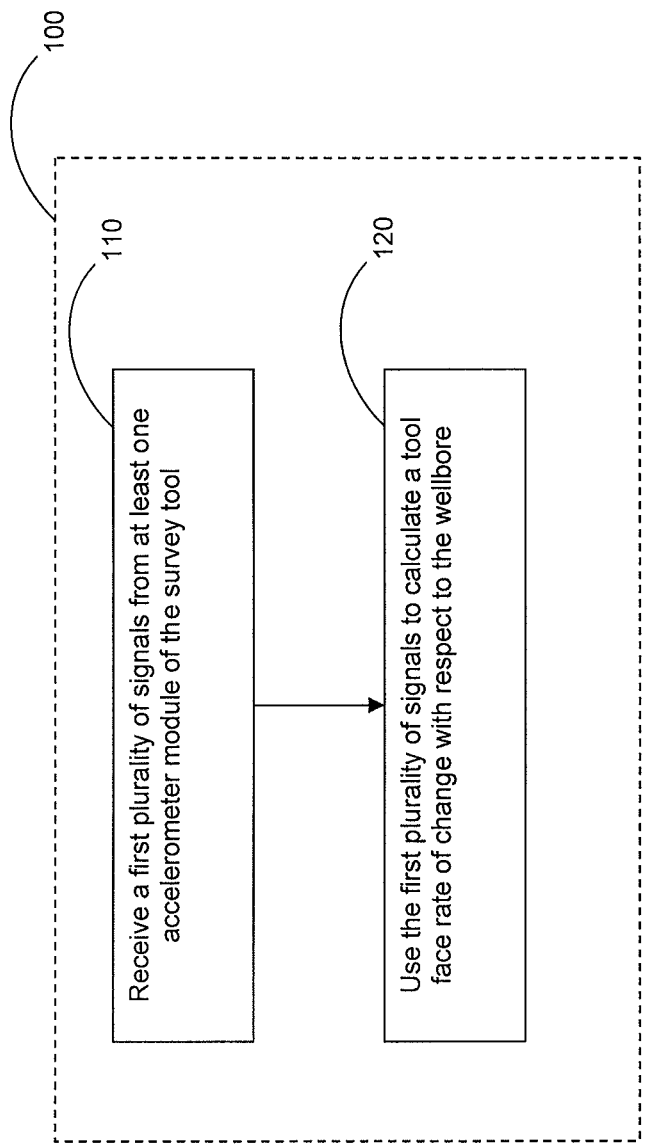
FIG. 1 is a flow diagram of an example method for monitoring the tool rotation during a gyrocompassing survey measurement while the survey tool is at a location along the wellbore in accordance with certain embodiments described herein.

Although certain configurations and examples are disclosed herein, the subject matter extends beyond the examples in the specifically disclosed configurations to other alternative configurations and/or uses, and to modifications and equivalents thereof. Thus, the scope of the claims appended hereto is not limited by any of the particular configurations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain configurations; however, the order of description should not be construed to imply that these operations are order-dependent. Additionally, the structures, systems, and/or devices described herein may be embodied as integrated components or as separate components. For purposes of comparing various configurations, certain aspects and advantages of these configurations are described. Not necessarily all such aspects or advantages are achieved by any particular configuration. Thus, for example, various configurations may be carried out in a manner that achieves or optimizes one advantage or group of advantages as taught herein without necessarily achieving other aspects or advantages as may also be taught or suggested herein.

In the discussion herein, attention is focused on certain embodiments in which systems and methods are used in conjunction with gyrocompassing survey measurements (e.g., gyroscopic measurements taken while the survey tool is substantially stationary to measure rotations due to the Earth's rotation), examples of which include, but are not limited to, gyro-while-drilling (GWD) applications or measurement-while-drilling (MWD) applications. However, the systems and methods described herein may also be used in certain other types of static/gyrocompassing wellbore surveys as well, including, but not limited to, wireline surveys, slickline surveys (e.g., surveys run on a wireline without communication to the surface), and drop surveys. As with other downhole measurement systems and methods, in certain embodiments described herein, the situation downhole is not known precisely; and failure of the survey tool to become totally static when measurement data are collected may degrade the accuracy of the survey.

When conducting a gyrocompassing survey of a wellbore, it is desirable that the survey tool remains perfectly stationary with respect to the Earth while the data is collected. Being stationary ensures that the at least one gyroscopic sensor module of the survey tool is subject only to the rotational motion of the Earth while the measurements are being made. The at least one gyroscopic sensor module measures one or more components of the Earth's rotation vector, and these measurements are used, in combination with measurements of tool inclination and tool face angle, to compute the azimuth of the survey tool, and hence the azimuth (A) of the wellbore, at the location of the survey tool within the wellbore.

The azimuth can be calculated using the following equation:

$$A = \arctan\left[\frac{\omega_{Ex}\cos\alpha - \omega_{Ey}\sin\alpha}{(\omega_{Ex}\sin\alpha + \omega_{Ey}\cos\alpha)\cos I + \omega_{Ez}\sin I}\right] \quad (1)$$

where ($\omega_{Ex}$, $\omega_{Ey}$, $\omega_{Ez}$) are the orthogonal components of the Earth's rotation vector, I is the inclination angle, and $\alpha$ is the tool face angle. The inclination angle and the tool face angle can be generated from measurements of the orthogonal components ($a_x$, $a_y$, $a_z$) of the Earth's gravitation vector (e.g., provided by a triad of accelerometers mounted in the survey tool) as follows:

$$I = \arctan\left[\frac{\sqrt{a_x^2 + a_y^2}}{a_z}\right]; \text{ and} \quad (2)$$

$$\alpha = \arctan\left[\frac{-a_x}{-a_y}\right]. \quad (3)$$

The at least one gyroscopic sensor module of the survey tool measures the total rotation rate to which the survey tool is subjected. Thus, if the survey tool is not completely stationary during a gyrocompassing measurement, the rate gyroscopes of the at least one gyroscopic sensor module provide measurements of the Earth's rotation vector plus a small residual rotation of the survey tool in the wellbore. In certain such embodiments, the small residual rotation will occur principally about the longitudinal (z) axis of the survey tool (e.g., as a result of torque that has built up in the tool string during the drilling process).

The measured rotation rate may be expressed mathematically as follows:

$$\omega_{BI}^B = \omega_{EI}^B + \omega_{BE}^B. \quad (4)$$

The total rotation rate with respect to inertial space measured by the rate gyroscopes of the at least one gyroscopic sensor module can be expressed as:

$$\omega_{BI}^B = \begin{bmatrix} \omega_x \\ \omega_y \\ \omega_z \end{bmatrix}, \quad (5)$$

which is the vector sum of the Earth's rotation rate with respect to inertial space resolved in tool body axes:

$$\omega_{EI}^B \begin{bmatrix} \omega_{Ex} \\ \omega_{Ey} \\ \omega_{Ez} \end{bmatrix} = \Omega \begin{bmatrix} \cos\phi\cos A\cos I\sin\alpha + \sin\phi\sin I\sin\alpha + \cos\phi\sin A\cos A \\ \cos\phi\cos A\cos I\cos\alpha + \sin\phi\sin I\cos\alpha - \cos\phi\sin A\sin\alpha \\ \cos\phi\cos A\sin I - \sin\phi\cos I \end{bmatrix} \quad (6)$$

and the rotation rate of the tool body with respect to the Earth, expressed in tool body axes:

$$\omega_{BE}^B = \begin{bmatrix} 0 \\ 0 \\ \dot{\alpha} \end{bmatrix}, \quad (7)$$

where $\Omega$ is the Earth rotation rate, $\phi$ is the latitude at which the survey tool is located, A is the azimuth, I is the inclination angle, $\alpha$ is the tool face angle, and $\dot{\alpha}$ is the rate of change of tool face angle about the longitudinal axis of the survey tool.

Tests conducted using a survey tool comprising a three-axis gyroscopic sensor have revealed that the survey tool is indeed not always perfectly stationary during times at which the gyroscopic measurements are being made, with the result that the resulting survey data generated can be significantly in error. For example, a survey tool in a horizontal east/west wellbore rotating slowly (e.g., at 0.1°/hour) can give rise to an error in the calculated azimuth angle of approximately 0.4° at the equator, and this error can rise to about 0.8° if the measurements are performed at a latitude of 60°. Thus, rotation of the survey tool during times at which the at least one gyroscopic sensor module is being used to measure the Earth's rotation vector can produce error contributions to these measurements.

Certain embodiments described herein provide a method of monitoring this tool rotation during gyrocompassing survey measurements. Certain embodiments described herein provide a method of compensating for this potential source of survey error from gyrocompassing survey measurements. Because any gyroscopic sensor measurements would be subject to both rotation contributions, a gyroscopic sensor measurement cannot be used to measure the tool face angle rotation rate contributed by the small residual rotation. Certain embodiments described herein provide a system comprising at least one accelerometer module, in addition to any gyro-while-drilling or measurement-while-drilling (GWD/MWD) sensor modules, to provide signals which can be used to monitor the tool rotation and/or compensate for survey errors due to the tool rotation, during gyrocompassing survey measurements.

FIG. 1 is a flow diagram of an example method 100 for monitoring the tool rotation during a gyrocompassing survey measurement while the survey tool is at a location along the wellbore in accordance with certain embodiments described herein. In an operational block 110, the method 100 comprises receiving a first plurality of signals from at least one accelerometer module of the survey tool. The first plurality of signals from the at least one accelerometer module are indicative of measurements of the Earth's gravitation vector taken by the at least one accelerometer module while the survey tool is used for gyrocompassing at the location along the wellbore. The at least one accelerometer module can comprise one, two, three, or more accelerometer sensors (e.g., a triad of accelerometers) that provide signals indicative of three orthogonal components ($\alpha_x$, $\alpha_y$, $\alpha_z$) of the Earth's gravitation vector at the position of the at least one accelerometer module.

Various types of accelerometer sensors are capable of providing a desired level of measurement accuracy and resolution compatible with certain embodiments described herein. Examples include, but are not limited to, quartz flexure accelerometer sensors and microelectromechanical system (MEMS) devices. The measurement range may be in excess of ±1 g (e.g., in a range between ±1.2 g and ±1.5 g). The accelerometer sensors are advantageously sufficiently small to be accommodated in a down hole tool (e.g., within the confines of a 1¾-inch pressure case of a wellbore), capable of operating over the expected temperature range (e.g., −20° C. to +150° C., or greater), and capable of surviving the down hole vibration and shock environment that will be encountered during the drilling process.

The resolution and precision of the at least one accelerometer sensors can depend on the time and the desired angular rate uncertainty. For example, for errors below a maximum error on the toolface rate of 0.05°/hour over 15 seconds, the at least one accelerometer can provide noise levels below 0.14 mG. An analog-to-digital system with a range of ±1.2 G and 16 bits can give a resolution of 0.036 mG/count, which can satisfy the desired noise levels. If the time is increased, the accelerometer uncertainty can be increased as well.

In certain embodiments, the survey tool comprises at least one accelerometer module comprising a plurality of accelerometers that is part of either a gyro-while-drilling (GWD) survey tool or a measurement-while-drilling (MWD) survey tool (e.g., for determining the inclination and tool face angles at various positions along the wellbore being surveyed). In certain such embodiments, the first plurality of signals is provided by the at least one accelerometer module of the GWD/MWD survey tool. In certain other embodiments, the survey tool comprises at least one accelerometer module different from the at least one accelerometer module of the GWD/MWD survey tool, and the first plurality of signals are provided by this at least one accelerometer module different from that of the GWD/MWD survey tool. For example, the at least one accelerometer module can comprise one or more accelerometers that are dedicated to measurements of the Earth's gravitation vector during times at which the survey tool is used for gyrocompassing (e.g., that are not used for determining the inclination and tool face angles at various positions along the wellbore being surveyed, such as during gyrosteering measurements).

In an operational block 120, the method 100 further comprises using the first plurality of signals to calculate a tool face rate of change with respect to the wellbore measured while the survey tool remains at the location along the wellbore. For example, one or more signals indicative of the Earth's gravitation vector at time $t_k$ can be used, e.g., with equation (3), to calculate the measured tool face angle $\alpha_k$ at time $t_k$, and one or more signals indicative of the Earth's gravitation vector at later time $t_{k+1}$ can be used, e.g., with equation (3), to calculate the measured tool face angle $\alpha_{k+1}$ at time $t_{k+1}$. The tool face rate of change ($\dot{\alpha}_k$) can then be calculated by computing the difference between successive calculations of the measured tool face angle and dividing by the time ($\Delta t$) between the successive measurements. For example, the tool face rate at time step k can be expressed as:

$$\dot{\alpha}_k = \frac{\alpha_k - \alpha_{k-1}}{\Delta t}. \tag{8}$$

Other calculations of the tool face rate of change using the first plurality of signals are also compatible with certain embodiments described herein.

In certain embodiments, a sequence of measurements may be taken over a period of time, and these measurements may be averaged together to produce data for gyrocompassing. The accuracy of the tool face rate estimate generated in this way can increase if the time between successive tool face measurements ($\Delta t$) is increased. However, the total time available for such measurements may be restricted to a period of time deemed acceptable for performing the standard gyrocompassing operation (e.g., between 2 and 4 minutes in total). Note that taking measurements of the tool face rate over a longer period of time may be detrimental to performance since this rate may not be constant. A compromise may be reached in certain embodiments between increasing the total time for making the measurements to thereby increase the accuracy of the measurements and desiring to decrease the total time devoted to thereby provide perform quicker surveys.

Figure 2:
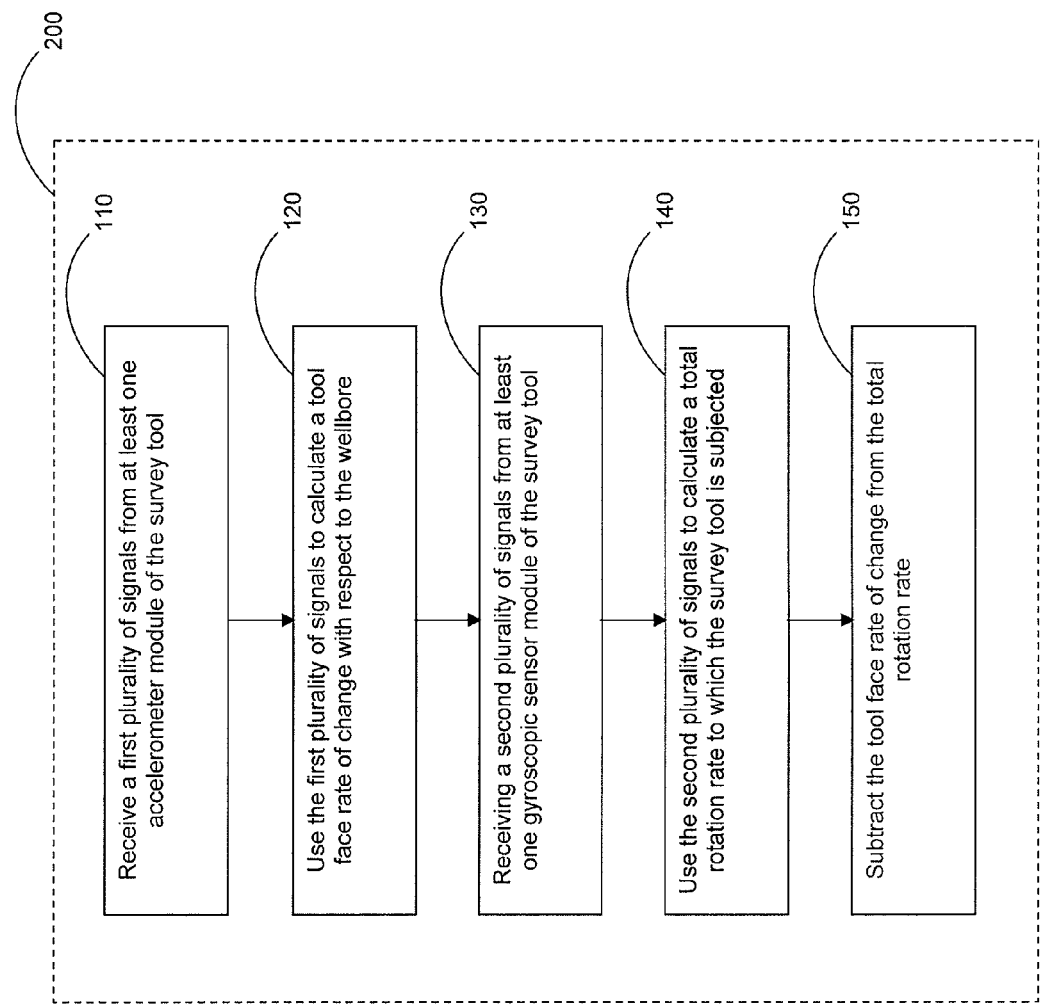
FIG. 2 is a flow diagram of an example method for compensating for the tool rotation during a gyrocompassing survey measurement while the survey tool is at a location along the wellbore in accordance with certain embodiments described herein.

FIG. 2 is a flow diagram of an example method 200 for compensating for the tool rotation during a gyrocompassing survey measurement while the survey tool is at a location along the wellbore in accordance with certain embodiments described herein. The method 200 can comprise the operational blocks 110 and 120 as described above. In an operational block 130, the method 200 further comprises receiving a second plurality of signals from at least one gyroscopic sensor module of the survey tool. The second plurality of signals is indicative of the total rotation rate to which the survey tool is subjected during the gyrocompassing survey measurement. The at least one gyroscopic sensor module can comprise one or more gyroscopic sensors. Example gyroscopic sensors compatible with embodiments described herein are described more fully in "Survey Accuracy is Improved by a New, Small OD Gyro," G. W. Uttecht, J. P. deWardt, World Oil, March 1983; U.S. Pat. Nos. 5,657,547, 5,821,414, and 5,806,195. These references are incorporated in their entireties by reference herein. Other examples of gyroscopic sensors are described by U.S. Pat. Nos. 6,347, 282, 6,957,580, 7,117,605, 7,225,550, 7,234,539, 7,350,410, and 7,669,656 each of which is incorporated in its entirety by reference herein.

Various types of gyroscopic sensors are compatible with certain embodiments described herein. The one or more gyroscopic sensors are advantageously capable of providing measurements of turn rate to the desired accuracy (e.g., in a range from 0.01°/hour to 0.05°/hour). Examples include, but are not limited to, spinning wheel gyros, optical gyros, and MEMS gyros. The one or more gyroscopic sensors are advantageously sufficiently small to be accommodated in a down hole tool (e.g., within the confines of a 1¾-inch pressure case of a wellbore), capable of operating over the expected temperature range (e.g., −20° C. to +150° C., or greater), and capable of surviving the down hole vibration and shock environment that will be encountered during the drilling process.

In an operational block 140, the method 200 further comprises using the second plurality of signals to calculate the total rotation rate to which the survey tool is subjected during the gyrocompassing survey measurement. The second plurality of signals are indicative of measurements of the total rate of rotation with respect to inertial space, In an operational block 150, the method 200 further comprises subtracting the tool face rate of change with respect to the wellbore from the total rotation rate to which the survey tool is subjected during the gyrocompassing survey measurement. In certain embodiments, the tool face rate of change is subtracted from the component ($\omega_z$) of the total rotation rate about the longitudinal (z) axis of the survey tool, e.g., using equations (4)-(7) above. In certain embodiments, subtracting the tool face rate of change from the total rotation rate is performed as part of a calibration correction process of the at least one gyroscopic sensor module. In certain such embodiments, the component of the Earth's rotation rate about the longitudinal (z) axis of the survey tool can be determined and used to compute the azimuth at the corresponding sample time.

Figure 3A:
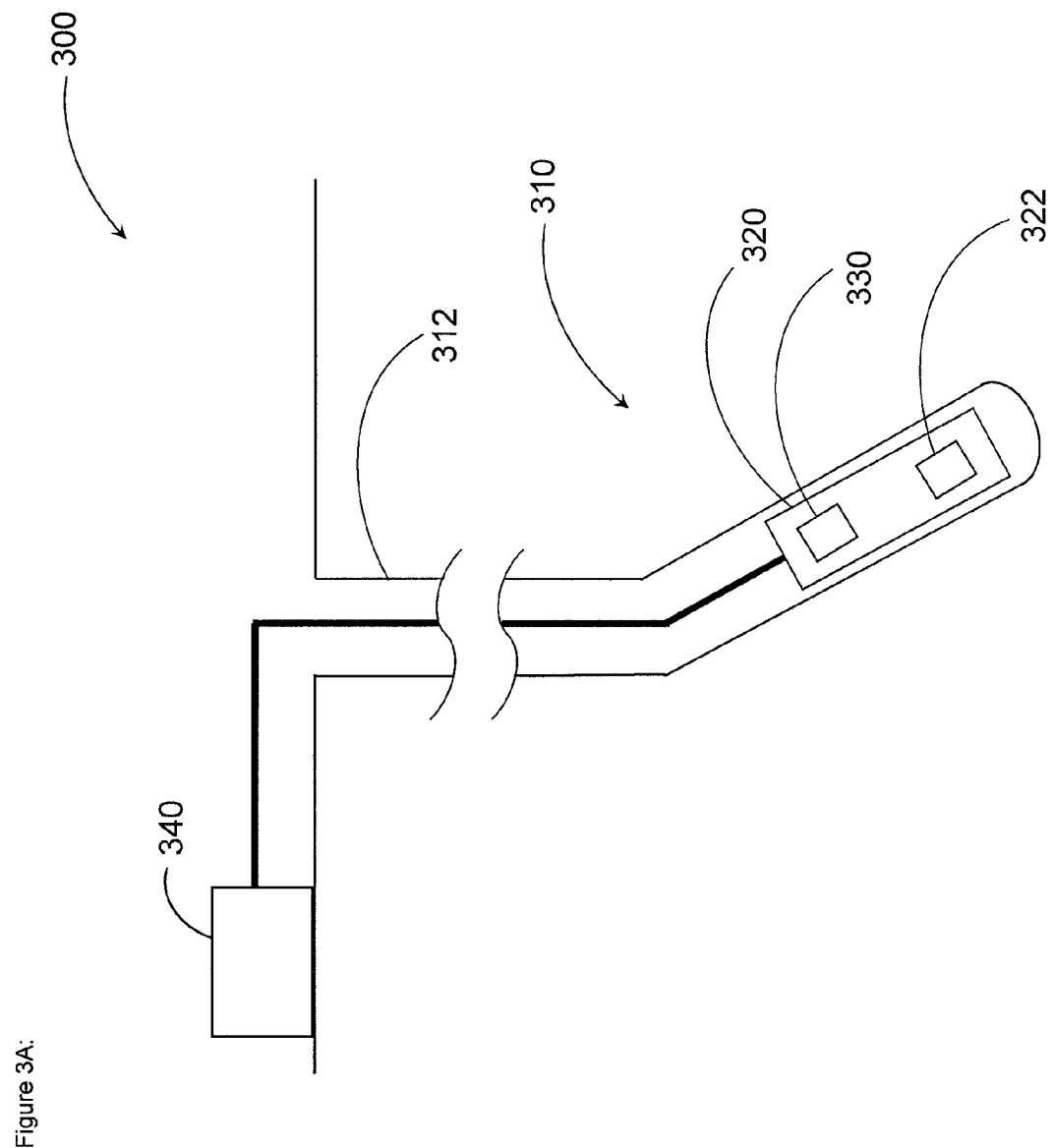
FIG. 3A schematically illustrates an example system in accordance with certain embodiments described herein.
Figure 3B:
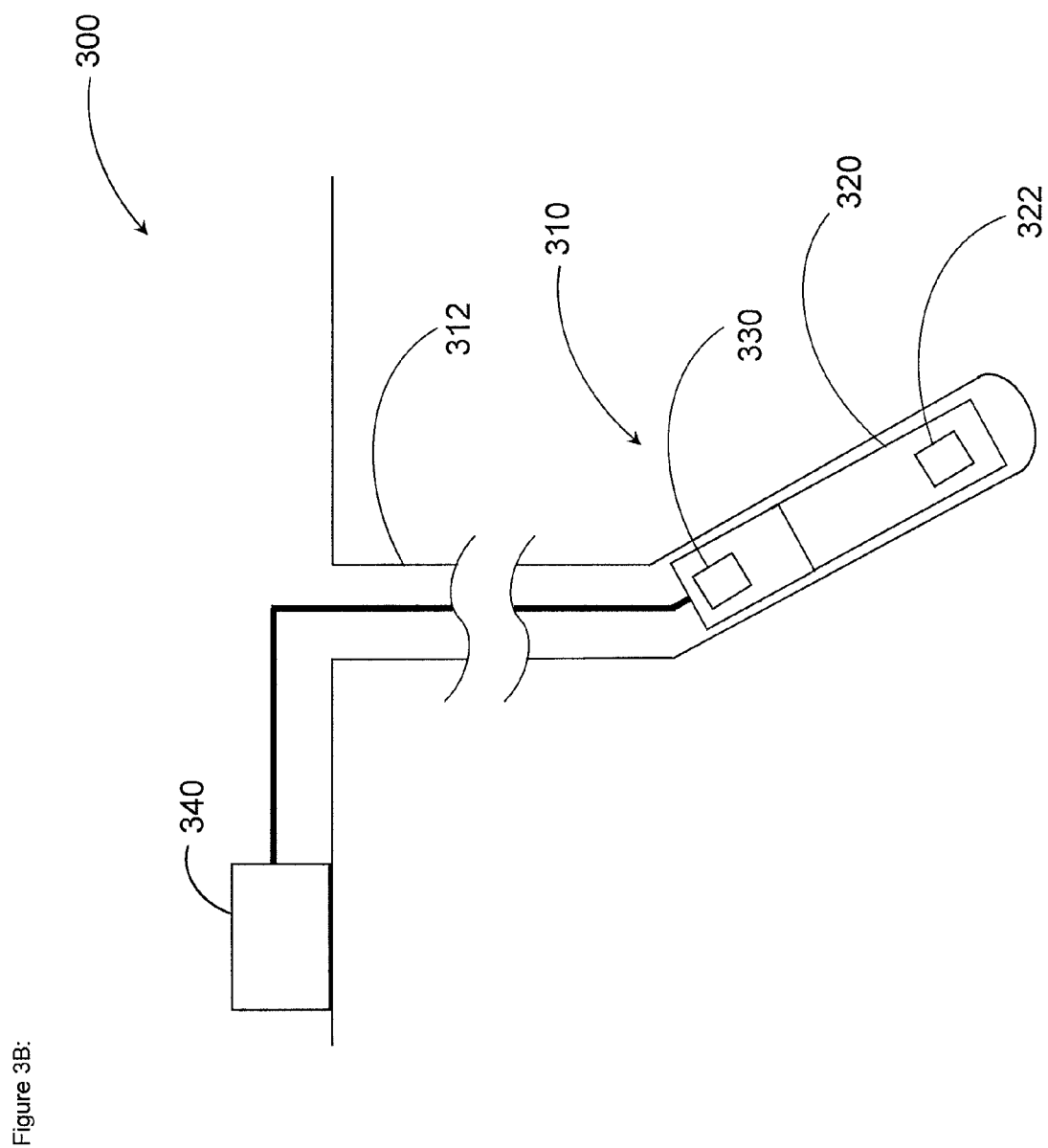
FIG. 3B schematically illustrates another example system in accordance with certain embodiments described herein.

FIG. 3A schematically illustrates an example system 300 in accordance with certain embodiments described herein, and FIG. 3B schematically illustrates another example system 300 in accordance with certain embodiments described herein. The system 300 comprises a tool string 310 configured to be within a wellbore 312 and comprising a survey tool 320 configured to perform gyrocompassing surveys. The survey tool 320 can comprise at least one gyro-while-drilling (GWD) survey tool or at least one measurement-while-drilling (MWD) survey tool. The survey tool 320 comprises at least one gyroscopic sensor module 322 configured to generate a first one or more signals indicative of measurements of the total rotation rate to which the at least one gyroscopic sensor module 322 is exposed during a gyrocompassing survey. The total rotation rate comprises a first contribution due to the Earth's rotation vector and a second contribution due to rotation of the survey tool 320 during a gyrocompassing survey.

The system 300 further comprises at least one accelerometer module 330 configured to generate a second one or more signals indicative of measurements of the Earth's gravitation vector at the at least one accelerometer module 330. In certain embodiments, as shown in FIG. 3A, the at least one accelerometer module 330 is part of the survey tool 320 (e.g., the GWD survey tool or the MWD survey tool). In certain other embodiments, as shown in FIG. 3B, the at least one accelerometer module 330 is separate from the survey tool 320 (e.g., the at least one accelerometer module 330 is in addition to at least one accelerometer module of the survey tool 320). For example, the at least one accelerometer module 330 can comprise one or more accelerometers that are dedicated to measurements of the Earth's gravitation vector during times at which the survey tool 320 is used for gyrocompassing (e.g., that are not used for determining the inclination and tool face angles at various positions along the wellbore being surveyed).

In certain embodiments, the at least one accelerometer module 330 comprises one or more cross-axial accelerometers configured to sense two or more components of the Earth's gravitation vector. In certain embodiments, the at least one accelerometer module 330 comprises two or more single-axis accelerometers, one or more two-axis accelerometers, and/or one or more three-axis accelerometers. Various types of accelerometer sensors are capable of providing a desired level of measurement accuracy and resolution compatible with certain embodiments described herein. Examples include, but are not limited to, quartz flexure accelerometer sensors and MEMS devices. The measurement range may be in excess of ±1 g (e.g., in a range between ±1.2 g and ±1.5 g). The accelerometer sensors are advantageously sufficiently small to be accommodated in a down hole tool (e.g., within the confines of a 1¾-inch pressure case of a wellbore), capable of operating over the expected temperature range (e.g., −20° C. to +150° C., or greater), and capable of surviving the down hole vibration and shock environment that will be encountered during the drilling process.

The resolution and precision of the at least one accelerometer sensors can depend on the time and the desired angular rate uncertainty. For example, for errors below a maximum error on the toolface rate of 0.05°/hour over 15 seconds, the at least one accelerometer can provide noise levels below 0.14 mG. An analog-to-digital system with a range of ±1.2 G and 16 bits can give a resolution of 0.036 mG/count, which can satisfy the desired noise levels. If the time is increased, the accelerometer uncertainty can be increased as well.

The system 300 further comprises at least one processor 340 (e.g., one or more micro-processors, a standard personal computer) configured to receive at least the first one or more signals and the second one or more signals. The at least one processor 340 is configured to determine the tool angle rotation rate in response to the second one or more signals (e.g., by performing the method 100 described herein). In certain embodiments, the at least one processor 340 is further configured to determine a rotation rate of the survey tool 320 compensated for the tool angle rotation rate in response to both the first one or more signals and the second one or more signals (e.g., by performing the method 200 described herein). For example, the at least one processor 340 can be further configured to calculate a tool face rate of change about a longitudinal axis of the survey tool using the second one or more signals, and to subtract the tool face rate of change from the measured tool angle rotation rate to provide the rotation rate of the survey tool 320 compensated for the tool angle rotation rate.

The at least one processor 340 can comprise one or more hardware processors in communication with at least one computer-readable memory that stores software modules including instructions that are executable by the one or more hardware processors. The software modules can include one or more software modules configured to receive a first plurality of signals from at least one accelerometer module 330 of the survey tool 320 (e.g., to perform the operational block 110 of the method 100) and to use the first plurality of signals to calculate a tool face rate of change with respect to the wellbore measured while the survey tool 320 remains at the location along the wellbore 312 (e.g., to perform the operational block 120 of the method 100). In certain embodiments, the one or more software modules can be further configured to receive a second plurality of signals from at least one gyroscopic sensor module 322 of the survey tool 320 (e.g., to perform the operational block 130 of the method 200), to use the second plurality of signals to calculate the total rotation rate to which the survey tool 320 is subjected during the gyrocompassing survey measurement (e.g., to perform the operational block 140 of the method 200), and to subtract the tool face rate of change with respect to the wellbore 312 from the total rotation rate to which the survey tool 320 is subjected during the gyrocompassing survey measurement (e.g., to perform the operational block 150 of the method 200). In certain embodiments, a non-transitory computer storage can be provided having stored thereon a computer program that instructs a computer system (e.g., the at least one processor 340) to perform one or more methods (e.g., the method 100, the method 200) compatible with certain embodiments described herein.

In certain embodiments, the at least one processor 340 is part of a controller generally configured to control and/or monitor the operation of the tool string 310 or portions thereof, with the controller comprising hardware, software, or a combination of both hardware and software. For example, in certain embodiments in which the tool string 310 comprises a drill string, the at least one processor 340 can be further configured to determine the current orientation or the trajectory of the drill string within the wellbore 312. The at least one processor 340 can further be configured to communicate with a memory subsystem configured to store appropriate information, such as orientation data, data obtained from one or more sensor modules on the drill string, etc.

In certain embodiments, the at least one processor 340 provides a real-time processing analysis of the signals or data obtained from various sensors of the survey tool 320. In certain such real-time processing embodiments, data obtained from the various sensor modules are analyzed in real-time. In certain embodiments, at least a portion of the data obtained from the various sensor modules is saved in memory for analysis by the at least one processor 340. The at least one processor 340 of certain such embodiments comprises sufficient data processing and data storage capacity to perform the real-time analysis.

In certain embodiments, the at least one processor 340 is located at or above the Earth's surface (e.g., as schematically illustrated by FIGS. 3A and 3B), or is located within the survey tool 320 within the wellbore. In some embodiments, a portion of the at least one processor 340 is located at or above the Earth's surface, and another portion of the at least one processor 340 is located within the wellbore and is communicatively coupled to the portion at or above the Earth's surface.

In certain embodiments, the system and method described herein are advantageously relevant and useful for measurements taken in high inclination wellbores. At low inclinations, the z-gyro measurement can have little effect on the calculation of azimuth, as indicated by equation (1). In such situations, the tool face rate can be expected to have little effect on the calculation. However, at high inclinations, the z-gyro measurement can become very significant and any contribution to the rotation rate beyond that of the Earth's rate component which is to be measured can lead to a significant azimuth error, as discussed above.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out completely (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary tangible, computer-readable storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method comprising:
receiving a first plurality of signals from at least one accelerometer module of a survey tool within a wellbore during a gyrocompassing survey measurement, the first plurality of signals indicative of measurements of the Earth's gravitation vector taken by the at least one accelerometer module during the gyrocompassing survey measurement;
using the first plurality of signals to calculate a tool face rate of change of the survey tool with respect to the wellbore during the gyrocompassing survey measurement; and
compensating for a tool rotation of the survey tool during the gyrocompassing survey measurement based on the tool face rate of change.

2. The method of claim 1, wherein the at least one accelerometer module is configured to provide signals indicative of three orthogonal components of the Earth's gravitation vector at the position of the at least one acceleration module.

3. The method of claim 1, wherein the survey tool comprises a gyro-while-drilling (GWD) survey tool or a measurement-while-drilling (MWD) survey tool and the at least one accelerometer module is part of the GWD survey tool or the MWD survey tool.

4. The method of claim 1, wherein the survey tool comprises a gyro-while-drilling (GWD) survey tool and the at least one accelerometer module is separate from the GWD survey tool.

5. The method of claim 1, wherein the survey tool comprises a measurement-while-drilling (MWD) survey tool and the at least one accelerometer module is separate from the MWD survey tool.

6. The method of claim 1, wherein the at least one acceleration module is dedicated to measurements of the Earth's gravitation vector during times at which the survey tool is used for gyrocompassing.

7. The method of claim 1, wherein compensating for the tool rotation of the survey tool during the gyrocompassing survey measurement based on the tool face rate of change comprises:
receiving a second plurality of signals from at least one gyroscopic sensor module of the survey tool, the second plurality of signals indicative of a total rotation rate to which the survey tool is subjected during the gyrocompassing survey measurement;
using the second plurality of signals to calculate the total rotation rate to which the survey tool is subjected during the gyrocompassing survey measurement; and
subtracting the tool face rate of change with respect to the wellbore during the gyrocompassing survey measurement from the total rotation rate to which the survey tool is subjected during the gyrocompassing survey measurement.

8. The method of claim 7, wherein the at least one gyroscopic sensor module comprises one or more rate gyroscopes.

9. The method of claim 7, wherein subtracting the tool face rate of change from the total rotation rate is performed as part of a calibration correction process of the at least one gyroscopic sensor module.

10. The method of claim 1, wherein the gyrocompassing survey measurement is taken during a survey selected from the group consisting of: a wireline survey, a slickline survey, and a drop survey.

11. A method for compensating for tool rotation of a survey tool within a wellbore during a gyrocompassing survey measurement, the method comprising:
receiving a first plurality of signals from at least one accelerometer module of the survey tool, the first plurality of signals indicative of measurements of the Earth's gravitation vector taken by the at least one accelerometer module during the gyrocompassing survey measurement;
using the first plurality of signals to calculate a tool face rate of change of the survey tool with respect to the wellbore during the gyrocompassing survey measurement;
receiving a second plurality of signals from at least one gyroscopic sensor module of the survey tool, the second plurality of signals indicative of a total rotation rate to which the survey tool is subjected during the gyrocompassing survey measurement;
using the second plurality of signals to calculate the total rotation rate to which the survey tool is subjected during the gyrocompassing survey measurement; and
subtracting the tool face rate of change with respect to the wellbore during the gyrocompassing survey measurement from the total rotation rate to which the survey tool is subjected during the gyrocompassing survey measurement.

12. A system comprising:
a survey tool configured to perform gyrocompassing surveys, the survey tool comprising at least one gyroscopic sensor module configured to generate a first one or more signals indicative of measurements of a total rotation rate to which the at least one gyroscopic sensor module is exposed during a gyrocompassing survey;
at least one accelerometer module configured to generate a second one or more signals indicative of measurements of the Earth's gravitation vector at the at least one accelerometer module; and
at least one processor configured to:
receive at least the first one or more signals and the second one or more signals;
determine a tool angle rotation rate in response to the second one or more signals; and
compensate for a tool rotation of the survey tool during the gyrocompassing survey based on the tool angle rotation rate.

13. The system of claim 12, wherein the at least one processor configured to compensate for a tool rotation of the survey tool during the gyrocompassing survey based on the tool angle rotation rate is further configured to subtract the tool angle rotation rate from the total rotation rate to which the at least one gyroscopic sensor module is exposed during a gyrocompassing survey.

14. The system of claim 12, wherein the tool angle rotation rate is a tool face rate of change about the longitudinal axis of the survey tool.

15. The system of claim 12, wherein the at least one accelerometer module is separate from the survey tool.

16. The system of claim 12, wherein the survey tool comprises at least one gyro-while-drilling (GWD) survey tool or at least one measurement-while-drilling (MWD) survey tool.

17. The system of claim 12, wherein the second one or more signals is indicative of three orthogonal components of the Earth's gravitation vector at the position of the at least one acceleration module.

18. The system of claim 12, wherein the survey tool is configured to perform gyrocompassing surveys selected from the group consisting of: wireline surveys, slickline surveys, and drop surveys.

* * * * *